March 10, 1970 TADAHIRO SEKIMOTO ET AL 3,500,247
NON-LINEAR PULSE CODE MODULATION WITH
THRESHOLD SELECTED SAMPLING
Filed Jan. 8, 1968 2 Sheets-Sheet 1

INVENTORS
TADAHIRO SEKIMOTO
WILLIAM G. SCHMIDT

BY Hughes, Rothwell, Mion, Zinn & Macpeak
ATTORNEYS

FIG. 2
| | S1 | S2 | S3 |
|---|---|---|---|
| A5 | 0 | 0 | 0 |
| A4 | 0 | 0 | 1 |
| A3 | 0 | 1 | 0 |
| A2 | 0 | 1 | 1 |
| A1 | 1 | 0 | 0 |
FIG. 3
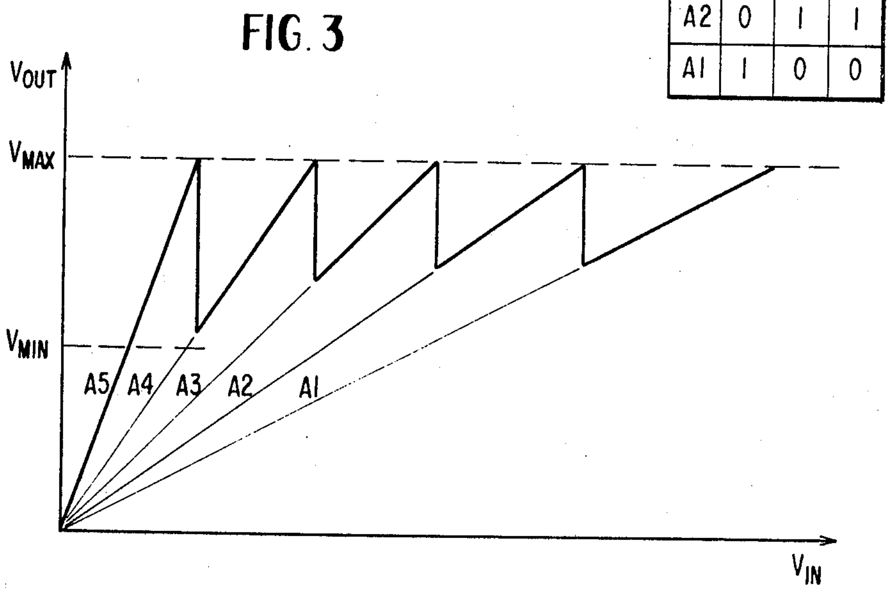
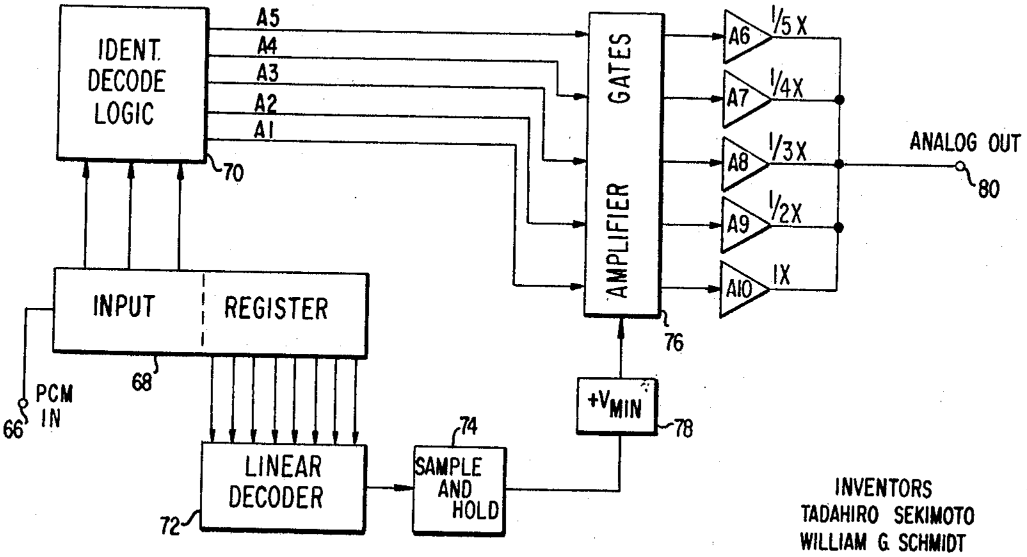
FIG. 4
INVENTORS
TADAHIRO SEKIMOTO
WILLIAM G. SCHMIDT
BY Sughrue, Rothwell, Mion, Zinn & Macpeak
ATTORNEYS United States Patent Office 3,500,247

Patented Mar. 10, 1970

3,500,247

NON-LINEAR PULSE CODE MODULATION WITH THRESHOLD SELECTED SAMPLING

Tadahiro Sekimoto, Tokyo, Japan, and William G. Schmidt, Rockville, Md., assignors to Communications Satellite Corporation, a corporation of Washington, D.C.

Filed Jan. 8, 1968, Ser. No. 696,185

Int. Cl. H03k 7/00

U.S. Cl. 332—11 7 Claims

ABSTRACT OF THE DISCLOSURE

A pulse code modulator having a plurality of parallel amplification channels with sequentially increasing gains. The output of the amplifier having the highest gain not exceeding a predetermined maximum is gated to a sample and hold circuit whose output feeds a linear PCM encoder. Bits identifying the selected amplifier channel are added to the encoder output.

BACKGROUND OF THE INVENTION

This invention relates to a method and apparatus for pulse code modulating an analog signal in a non-linear fashion.

In conventional PCM systems, the analog input is fed to a sample and hold circuit to provide an amplitude modulated pulse train having a frequency equal to the sampling rate and an envelope corresponding to the analog signal. The pulse train is then supplied to an encoder unit that quantizes each pulse and generates a corresponding digital code word for it, and these code words constitute the PCM signal. One of the limiting parameters of such systems is the number of quantizing levels available. The greater the number of such levels, the higher the signal resolution or fidelity. Increasing resolution by providing more quantizing levels also increases the hardware requirements, however, and results in longer code words and hence slower transmission rates for the same clocking speed.

One solution to this dilemma, as applied to audio transmissions, has been the use of companders, which are based on the fact that most of the intelligence in audio signals is concentrated in the middle and low amplitude ranges. In other words, moderate speech levels carry most of the information in a voice signal while very loud components or shouts convey little intelligence. Compander systems take advantage of this characteristic by non-linearly amplifying the audio signal, either before or after sampling, to expand the middle and low range portions of the signal proportionately more than the high range signals. This enlarges the most critical area of the speech signal and has the effect of increasing overall resolution without an attendant hardware increase or a slower transmission rate. The reconstructed pulse train or audio signal at the receiver end of the system is passed through an amplifier having a gain curve or transfer characteristic which is complementary to that of the transmitter amplifier, thus removing the distortion purposely introduced into the system and restoring the audio signal to its original form.

In actual use, the increased resolution afforded by such compander systems is more limited than might be expected, and is obtained at the sacrifice of good resolution in the high amplitude ranges. A further drawback is the requirement for amplifier pairs having accurately matched inverse or complementary gain characteristics, such components being relatively expensive and sensitive to temperature and power supply variations. In addition, compander systems still require sampling circuits operable over the entire input voltage range and such wide range circuits, usually of the diode bridge type, are sources of large errors due to mismatch in both the current drive and diode characteristics.

SUMMARY OF THE INVENTION

To overcome the above disadvantages attendant with the prior art systems, this invention provides a PCM system in which the analog input signal is simultaneously amplified in a plurality of parallel channels having sequentially increasing gains. Alternatively, the input signal may be attenuated by varying degrees in the parallel channels. The essential criterion is that the parallel channels provide the same input signal with sequentially related amplitudes. The outputs of all but the lowest gain amplifier are continuously monitored by threshold detectors having the same, preset triggering level. The detector outputs are in turn fed to a logic circuit that selects the channel having the highest gain not exceeding the threshold or triggering level. This channel is then gated to a conventional sample and hold circuit whose pulse output feeds a linear PCM encoder. The encoder pulses are supplied to an output register for transmission. The selection logic circuit output is also coupled to a coding circuit that identifies the selected channel by appropriately setting some additional stages in the output register. This entire operational pattern for the transmission end of the system is simply reversed at the receiving end to effect the necessary pulse code demodulation.

In this manner, the input signal is amplified or expanded to the maximum extent within the limits of the system, to thereby greatly increase the overall signal resolution without an attendant increase in the number of quantizing levels and without sacrificing the resolution of high amplitude signals. As an example, assume that a conventional PCM system transmits 8 bit binary code words, which would accommodate $2^8$ or 256 quantizing levels. If the maximum input signal range is 10 volts, then a 2 volt input signal could be resolved or quantized to approximately 1 part in 51 ($2/10 \times 256$), or, stated another way, to an accuracy of 39 millivolts (10/256). By the technique of this invention, however, the step size or quantizing accuracy is ultimately proportional to the gain of the amplification channel employed. Assuming five amplification channels with sequentially increasing gains of 1, 2, 3, 4 and 5, the same 2 volt input signal would be amplified by a factor of 5 to 10 volts which is still within the maximum signal handling range of the system. The expanded 2 volt signal may then be resolved to 1 part in 256 for a resolution factor increase of 5:1. The expanded signal is still quantized to an accuracy of 39 millivolts, but when the expansion is removed at the receiver end of the system, the 39 millivolt level shrinks to approximately 8 millivolts.

The overall gain curve of such a plural channel system has a saw-tooth configuration that lies in the upper signal handling range except for very low amplitude input signals. When dealing with voice communications, advantage may be taken of the fact that almost no intelligence is carried in the low amplitude or whisper range by establishing a minimum input voltage level and rejecting all signals below the minimum. This reduces the effective signal operating range of the system by a factor of 2 or more, which increases the resolution by an equal factor, reduces the maximum voltage requirements, and thus the expense, of the sample and hold and encoder circuitry, and enables faster operation.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings:

FIGURE 2 shows a truth table for the amplifier identification logic of FIGURE 1, FIGURE 3 shows a composite gain curve for the parallel amplification channels of FIGURE 1, and FIGURE 4 shows a block diagram of a PCM decoding system adapted for operation with the encoding system of FIGURE 1.

DESCRIPTION OF THE PREFERRED EMBODIMENT

Figure 1:
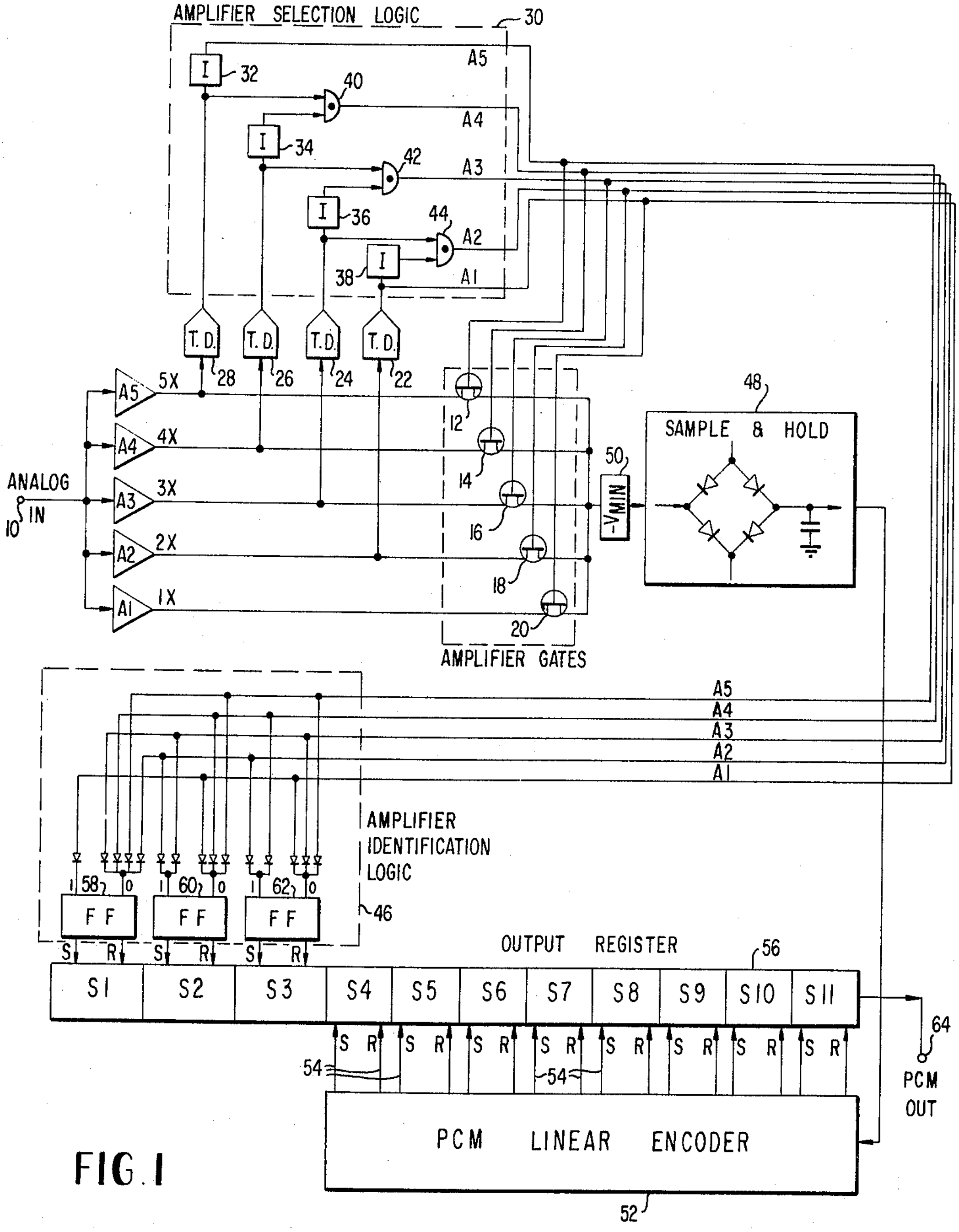
FIGURE 1 shows a block diagram of a PCM encoding system constructed in accordance with the teachings of this invention.

Referring now to FIGURE 1, the analog input signal applied to terminal 10 is branched to five parallel connected amplifiers A1, A2, A3, A4 and A5 having respective gains of 1, 2, 3, 4 and 5 as indicated in the drawings. The analog input signal may be derived from a single source or it may be supplied from a plural channel multiplexer, its precise origin being outside the scope of the invention. The sequentially related gains of the five amplifiers may be more readily understood from FIGURE 3 in which the straight lines labeled A1, A2, A3, A4 and A5 represent the input versus output voltage characteristics, or gains, of the corresponding amplifiers. Once again, the same amplitude relationships could alternately be provided by attenuating the input signal to varying degrees.

The output of each amplifier is fed to an associated gate 12, 14, 16, 18 and 20, shown here as field effect transistors. The outputs of amplifiers A2, A3, A4 and A5 are also supplied to threshold detectors 22, 24, 26 and 28, respectively, each having the same, preset triggering or threshold level of $V_{max.}$ The detector outputs are coupled to an amplifier selection logic circuit 30 comprising Inverters 32, 34, 36 and 38 and AND gates 40, 42 and 44. The logic circuit has five output lines designated A1–A5 and is designed to raise the output line corresponding to the amplifier having the highest signal not exceeding the $V_{max.}$, threshold level.

The outputs from the selection logic circuit 30 are individually coupled to the gate terminals of transistors 12, 14, 16, 18 and 20, and are also fed to an amplifier identification logic circuit 46. The gate outputs are connected in common and supplied to a conventional sample and hold circuit 48 of the diode bridge type that converts the analog signals to a pulse amplitude modulated wave form. Before such conversion, the analog signals are diminished in amplitude by an amount equal to $V_{min.}$, in FIGURE 3. This may be implemented by any voltage subtracting means 50 known in the art, such as a series-connected battery, a Zener diode having a breakdown voltage of $V_{min.}$, etc.

The PAM signal from the sample and hold circuit 48 is fed to a linear PCM encoder 52, which may be of any conventional type well known in the art. The encoder 52 quantizes each pulse in the PAM signal by selecting the closest amplitude level thereto and generates an 8 bit binary code word corresponding to the selected level. The code word is represented by raising the potentials on appropriate ones of the set and reset lines 54 at the encoder output, and these potentials place the bistable stages S4–S11 in the output register 56 in the proper states corresponding to the code word.

In the amplifier identification logic circuit 46, three flip-flops 58, 60 and 62 are individually placed in their set or reset states by the output lines A1–A5 from the selection logic circuit 30 according to the truth table shown in FIGURE 2. The latter is implemented by a network of diode OR gates. The set and reset outputs of the flip-flops in turn place the bistable stages S1–S3 in the output register 56 in the proper states to identify the amplifier channel that is being used for the code word in register stages S4–S11. When the register 56 is fully loaded with the channel identification bits in stages S1–S3 and the PCM word bits in stages S4–S11, it is stepped or read out serially to deliver the entire bit sequence to the PCM output terminal 64. As an alternative, the register could be read out in parallel fashion, such being outside the scope of the invention.

Various conventional details of the circuitry of FIGURE 1 have been omitted from the drawing and the above description for the sake of simplicity. For example, no power supplies or biasing sources have been shown, and the clocking circuitry has been omitted. The latter would operate the sample and hold circuit at the Nyquist rate, which is equal to twice the frequency of the highest frequency component of the analog input signal, and would control the encoder converting and transfer functions, as well as the register stepping. Furthermore, if bipolar analog input signals are to be handled, it will be necessary to full wave rectify them before applying them to input terminal 10. A polarity bit must then accompany each coded transmission so that negative inputs may be inverted at the receiver or decoder end of the system to restore the original wave form.

The PCM decoding system shown in FIGURE 4 is adapted to be used at the receiver end of a communications system employing the PCM encoder of FIGURE 1, and is basically the reverse of the FIGURE 1 arrangement. The PCM signal is delivered to input terminal 66 after transmission by microwave, overground wires or by any other suitable means. It is fed to an eleven stage input register 68 whose first three stages are sensed by an identification decoding logic circuit 70 and whose last eight stages are sensed by a linear PCM decoder 72. The logic circuit 70 contains three flip-flops and five AND gates arranged to decode the truth table of FIGURE 2 and raise one of the output lines A1–A5 corresponding to the amplification channel of FIGURE 1 used to expand the pulse coded signal in the remaining stages of the register 68. The PCM decoder 72 converts each eight bit code to an equivalent pulse amplitude and delivers same to the sample and hold circuit 74. The latter may be the same as the sample and hold circuit 48 in the encoder but is connected in reverse, that is, the pulse input is supplied to the charging or holding capacitor and the analog output is taken from the opposite diagonal of the diode bridge. The sample and hold output is supplied to a set of amplifier gates 76 through a voltage adder 78 that restores the $V_{min.}$ potential removed at the encoder end. The amplifier gates are identical to those in FIGURE 1 and pass the analog signal from the adder 78 to the proper output amplifier channel under the control of the identification decoding logic circuit 70. The output amplifiers A6, A7, A8, A9 and A10 have respective gains of ⅕, ¼, ⅓, ½ and 1, and their gain ratios are thus the inverse of the gain ratios in the encoders. This removes the distortion introduced into the system in the encoder and restores the analog signal to its original form at output terminal 80. While no shown, smoothing filters would normally be incorporated into the receiver decoding system to remove any transient or noise signals generated by the rapid switching from one amplification channel to another.

OPERATION

The operation of the PCM system of the present invention will now be described by following an analog input signal applied to terminal 10 through to its final output at terminal 80. It will be assumed that the signal handling range of the system, that is, $V_{max.}$, is 10 volts and that the instantaneous value of the analog input signal is 3 volts. The five parallel amplifiers A1–A5 will simultaneously act on the input signal and produce respective outputs of 3, 6, 9, 12 and 15 volts. Since all of the threshold detectors are set to switch at the $V_{max.}$ level of 10 volts, the outputs of threshold detectors 26 and 28 will be up, while those of threshold detectors 22 and 24 will be down. The raised output of threshold detector 28 conditions AND gate 40 and causes inverter 32 to drop output line A5 of the selection logic circuit 30, thus eliminating amplifier channel A5 from selection. The raised output from threshold detector 26 conditions AND gate 42 and causes inverter 34 to lower its output, thereby blocking AND gate 40 and holding output line A4 down. Since threshold detector 24 senses only 9 volts at the output of amplifier A3, its output is down. This causes inverter 36 to raise its output, which, in conjunction with the conditioning signal from threshold detector 26, actuates AND gate 42. Line A3 is therefore raised to select amplifier A3 as the active channel for the applied 3 volt input signal. The down output from threshold detector 24 blocks AND gate 44 to hold line A2 down, and the down output from threshold detector 22 holds lines A1 down.

Thus, the amplifier selection logic circuit 30 is always effective to raise only one output line corresponding to the amplifier channel having the highest output not exceeding the $V_{max.}$ level. The raised signal on line A3 from the selection logic circuit 30 gates the 9 volt output from amplifier A3 through field effect transistor 16 to the voltage subtractor 50, while the lowered signals on lines A1, A2, A4 and A5 hold transistors 20, 18, 14 and 12 off, respectively, to block the corresponding amplifier outputs. This results in a composite gain curve for the gated amplifiers as represented by the heavy, zigzag line in FIGURE 3, and ensures that each input signal will be expanded to its maximum extent with the $V_{max.}$ limit of 10 volts before being further processed.

It may be seen from FIGURE 3 that the major portion of the composite gain curve lies in the upper signal handling range of the system, while the only portion in the lower range, running up from the origin along the gain curve of amplifier A5, corresponds to very low amplitude input signals. Since these low amplitude or whisper signals convey almost no intelligence in audio or voice transmissions, they may be eliminated with little sacrifice in fidelity. This is accomplished by the voltage subtractor 50, which will be assumed to subtract a $V_{min.}$ value of 5 volts from the amplifier gate output. This 5 volt subtraction has the effect of moving the abscissa or $V_{in}$ coordinate line in FIGURE 3 up to the $V_{min.}$ level, which shrinks the operating range of the system beyond the subtractor 50 from 10 volts down to 5 volts. As mentioned earlier, a 2:1 reduction of this nature doubles the PCM signal resolution, enables substantial savings in the cost of the sample and hold and encoder circuits, and permits more rapid operation.

With a 9 volt input, the subtractor 50 supplies a 9–5 volt or 4 volt output to the sample and hold circuit 48, which in turn converts the 4 volt analog signal to a pulse having an amplitude of 4 volts. This pulse is fed to the PCM linear encoder 52 where it is quantized to the nearest one of 256 amplitude levels and converted to a corresponding eight bit digital code. The code word bits are applied to the binary stages S4–S11 in the output register 56 by the set and restet lines 54.

At the same time, the raised signal on line A3 from the selection logic circuit 30 is supplied to the amplifier identification logic circuit 46. This signal passes through diode OR gates at the zero input of flip-flop 58, the one input of flip-flop 60 and the zero input of flip-flip 62, to thereby place the three flip-flops in a 010 sequence in accordance with the truth table of FIGURE 2. The flip–flops states are reflected on their set and reset outputs which in turn place output register stages S1, S2 and S3 in their 0, 1 and 0 states, respectively.

At this point, the output register 56 is fully loaded with the bits of the first three stages identifying the threshold selected amplifier chanel A3 an dthe bits in the last eight stages being the coded representation of the quantizing level nearest the 4 volt signal. The contents of the register may then be stepped out serially to the PCM output terminal 64 for transmission to a remote receiving station.

Referring to FIGURE 4, the received PCM signal is applied to in put terminal 66 from which it loads the eleven stage input register 68. Once loaded, the first three stages of the register, containing the channel identification bits, are sensed by the identification decoding logic circuit 70, while the last eight stages, containing the coded pulse bits, are sensed by the PCM linear decoder 72. The decoder converts the code word back into a 4 volt pulse and applies it to the same and hold circuit 74, whose 4 volt analog output is fed to voltage adder 78. The five volts subtracted from the signal in the modulation end of the system, corresponding to $V_{min.}$, are restored by adder 78, whose 9 volt output is applied to the amplifier gates 76. The identification decoding logic circuit 70 raises output line A3 which gates the 9 volt signal through output amplified A8 having a gain of ⅓. With a gain of ⅓, the distortion introduced at the modulator by multiplying the original input signal by a factor of 3 is removed and the analog output of terminal 80 is restored to its original form.

While the invention has been particularly shown and described with reference to a preferred embodiment thereof, it will be understood by those skilled in the art that various changes in form and details may be made therein without departing from the spirit and scope of the invention.

What is claimed is:

1. A non-linear pulse code modulator comprising:

(a) a plurality of signal amplitude modifiers coupled to a common input terminal and having sequentially related output amplitudes, (b) means for converting an analog signal into a pulse code modulated signal, and (c) means for coupling the modifier output having the highest amplitude not exceeding a predetermined maximum to the converting means.

2. A non-linear pulse code modulator as defined in claim 1 wherein the signal amplitude modifiers are parallel connected amplifiers having sequentially increasing gains.

3. A non-linear pulse code modulator as defined in claim 1 wherein the coupling means comprises:

(a) a plurality of threshold detectors individually connected to all of the modifier outputs except the one having the lowest relative output amplitude, and set to trigger at the predetermined maximum signal level, (b) a logic circuit including a plurality of AND gates and inverters responsive to the threshold detector outputs for producing an output identifying the modifier having the highest amplitude not exceeding the predetermined maximum, and (c) gating means responsive to the logic circuit output for connecting the identified modifier to the converting means.

4. A non-linear pulse code modulator as defined in claim 1 further comprising:

(a) means responsive to the coupling means for generating a pulse code identifying the selected modifier output, and (b) means for combining the pulse code with the pulse code modulated signal produced by the converting means.

5. A non-linear pulse code modulator as defined in claim 1 further comprising means for subtractively reducing the amplitude of the modifier output coupled to the converting means to thereby reduce the operating range of the converting means.

6. A non-linear pulse code modulator as defined in claim 3 further comprising:
   (a) means responsive to the logic circuit output for generating a pulse code identifying the selected modifier output, and
   (b) means for combining the pulse code with the pulse code modulated signal produced by the converting means.

7. A non-linear pulse code modulator as defined in claim 6 further comprising means for subtractively reducing the amplitude of the modifier output coupled to the converting means to thereby reduce the operating range of the converting means.

References Cited

UNITED STATES PATENTS 3,408,595 10/1968 Hillman ------------- 322—11

FOREIGN PATENTS 1,151,550 7/1963 Germany.

ROY LAKE, Primary Examiner

U.S. Cl. X.R.

325—38, 143; 328—28; 340—347